United States Patent [19]

Kobayashi

[11] Patent Number: 5,371,779
[45] Date of Patent: Dec. 6, 1994

[54] CALL INITIATING SYSTEM FOR MOBILE TELEPHONE UNITS

[75] Inventor: Hideharu Kobayashi, Tokyo, Japan

[73] Assignee: NEC Corporation, Tokyo, Japan

[21] Appl. No.: 31,293

[22] Filed: Mar. 12, 1993

[30] Foreign Application Priority Data

Mar. 13, 1992 [JP] Japan .................... 4-054545

[51] Int. Cl.⁵ .................. H04M 11/00; H04M 1/64; H04M 1/00; H04B 7/00
[52] U.S. Cl. ........................ 379/58; 379/63; 379/68; 379/350; 379/356; 455/38.1
[58] Field of Search ............ 379/56, 58, 63, 68, 379/69, 350, 352, 354, 356, 359; 455/38.1, 158.5; 381/41, 42, 43

[56] References Cited

U.S. PATENT DOCUMENTS

| | | | |
|---|---|---|---|
| 4,587,670 | 5/1986 | Levinson et al. | 381/43 |
| 4,674,111 | 6/1987 | Monet et al. | 379/58 |
| 4,677,657 | 6/1987 | Nagata et al. | 379/63 |
| 4,682,357 | 7/1987 | Irino | 379/356 |
| 4,682,368 | 7/1987 | Takahashi | 455/38.1 |
| 4,870,686 | 9/1989 | Gerson et al. | 381/43 |
| 5,148,471 | 9/1992 | Metruka et al. | 379/58 |

FOREIGN PATENT DOCUMENTS

| | | | |
|---|---|---|---|
| 0248057 | 12/1985 | Japan | 379/68 |
| 0096856 | 5/1986 | Japan | 379/357 |
| 0231553 | 10/1987 | Japan | 379/350 |

OTHER PUBLICATIONS

Miyatake, Tsurufuji, Iida, Mori, "A Voice Activated Telephone", IEEE Transactions on Consumer Electronics, Aug. 1986.

Vanantwerp, "Cordless Voice Dial", IEEE Computer Society Press, Feb. 1992.

Primary Examiner—Curtis Kuntz
Assistant Examiner—William Cumming
Attorney, Agent, or Firm—Foley & Lardner

[57] ABSTRACT

A telephone call initiating system according to the invention is provided in order to make it possible to control telephone call initiation from an extremely small mobile communication terminal. This is accomplished with a key input section, a speech recognition section, a data base and display section, and a data base input control section for forming a record. The record consists of telephone number data from the key input section and data including family and given names from the speech recognition section. The record is stored into the data base. A search parameter accepting section searches the data base for the record according to data including the family and given names, and stores the retrieved record into a work area. A scroll control section scrolls, in predetermined units, the retrieved record and displays the data on the display section. A call initiation accepting section supplies a call initiating instruction according to the telephone number in the scrolled record, and a call initiation processing section responds to the call initiating instruction to initiate a call according to the telephone number.

1 Claim, 4 Drawing Sheets

FIG. 2

| Family Name | Name | Occupation | City | Telephone Number |
|---|---|---|---|---|
| SATO | ICHIRO | KAISHAIN | TOKYO | 03-3571-2857 |
| NICHIDEN | TARO | KAISHAIN | OSAKA | 06-452-1111 |
| ⋮ | ⋮ | ⋮ | ⋮ | ⋮ |

CALL INITIATING SYSTEM FOR MOBILE TELEPHONE UNITS

BACKGROUND OF THE INVENTION

1. Field of the Invention

The present invention relates to a call initiating system for mobile communication terminals including portable telephone units.

2. Description of the Prior Art

Today, the dissemination of mobile communication terminals including car telephones and portable telephones is truly significant, and their use is expanding, especially in big cities, from the business community to common house-holds. Supported by the remarkable development of LSI technology and digital processing technology, these mobile communication terminals are becoming ever more compact and more sophisticated functionally. In terms of compactness, units comparable to ordinary telephone sets are already available, and their unit size is predicted to be reduced to about 100 cc in the near future and further to a wrist watch size eventually. In the functional aspect, existing models already have the abbreviated dialing or one-touch dialing function for use with frequently accessed communication partners and the automatic redialing function for use when the other party's line is found busy at the first call attempt, and an even greater variety of functions are likely to be added in the future along with the further sophistication of networks.

Although progress is recognized in these aspects of mobile communication terminal technology, it seems difficult to introduce a fundamental renovation in the technique for call initiation by the calling subscriber, i.e. in the currently used call initiation by dialing. However, as the use of telephone communication will further expand along with the development and globalization of economic and business activities, the current method of searching a personal memo or the telephone directory for the other party's telephone number and the dialing on that basis will become too inefficient, and are likely to be replaced in the future by retrieval from a data base within the mobile communication terminal itself, utilizing LSI technology and data base technology.

In order to enable the telephone number to be retrieved from the data base within the mobile communication terminal of the aforementioned wrist watch size and a call to be initiated by the retrieved number, the space occupied by the data display means, such as an LCD display, and the call initiating means, such as dialing keys, should be minimized.

BRIEF SUMMARY OF THE INVENTION

Objects of the Invention

An object of the present invention, therefore, is to provide a mobile communication terminal which would make it possible quickly and efficiently to find out the subscriber number of the party on whom a call is to be initiated and to initiate the call by structuring a data base of subscriber numbers with speech signals and inputting the parameters of data retrieval by speech signals.

Another object of the invention is to provide a telephone call initiating technique suitable for use with compact mobile communication terminals.

Summary of the Invention

A telephone call initiating system for use with compact mobile communication terminals according to the invention consists of key input means for accepting inputs by key manipulation; speech recognition means for accepting inputs in speech signals; a subscriber number data base and data display means; input control means for the subscriber number data base; search parameter accepting means; scroll control means; call initiating accepting means; and call initiation processing means. The input control means for the subscriber number data base, having a function to accept requests for inputting to a data base and prepare a data base of subscriber numbers, formulates a record consisting of a subscriber number entered with said key input means and data on a called subscriber's name entered with said speech recognition means, and stores the record into the subscriber number data base. The search parameter accepting means, having a function to accept requests for searching the data base and search the subscriber number data base, searches said subscriber number data base for said record according to data on the called subscriber's name from said speech recognition means, and stores the retrieved record, which is the result of search, into a work area. The scroll control means, in response to a request for scrolling, scrolls in predetermined units said retrieved record stored in said work area, and displays on said display means said retrieved record which has been scrolled. The call initiation accepting means, in response to a request for call initiation, supplies a call initiating instruction according to the subscriber number in said record which has been scrolled, and the call initiation processing means, in response to said call initiating instruction, initiates a call according to said subscriber number.

BRIEF DESCRIPTION OF THE DRAWINGS

The above-mentioned and other objects, features and advantages of the present invention will become more apparent from the following detailed description when taken in conjunction with the accompanying drawings, wherein:

FIG. 2 illustrates a typical configuration of a record in the data base of the mobile communication terminal shown in FIG. 1;

DETAILED DESCRIPTION OF THE PREFERRED EMBODIMENT

Figure 1:
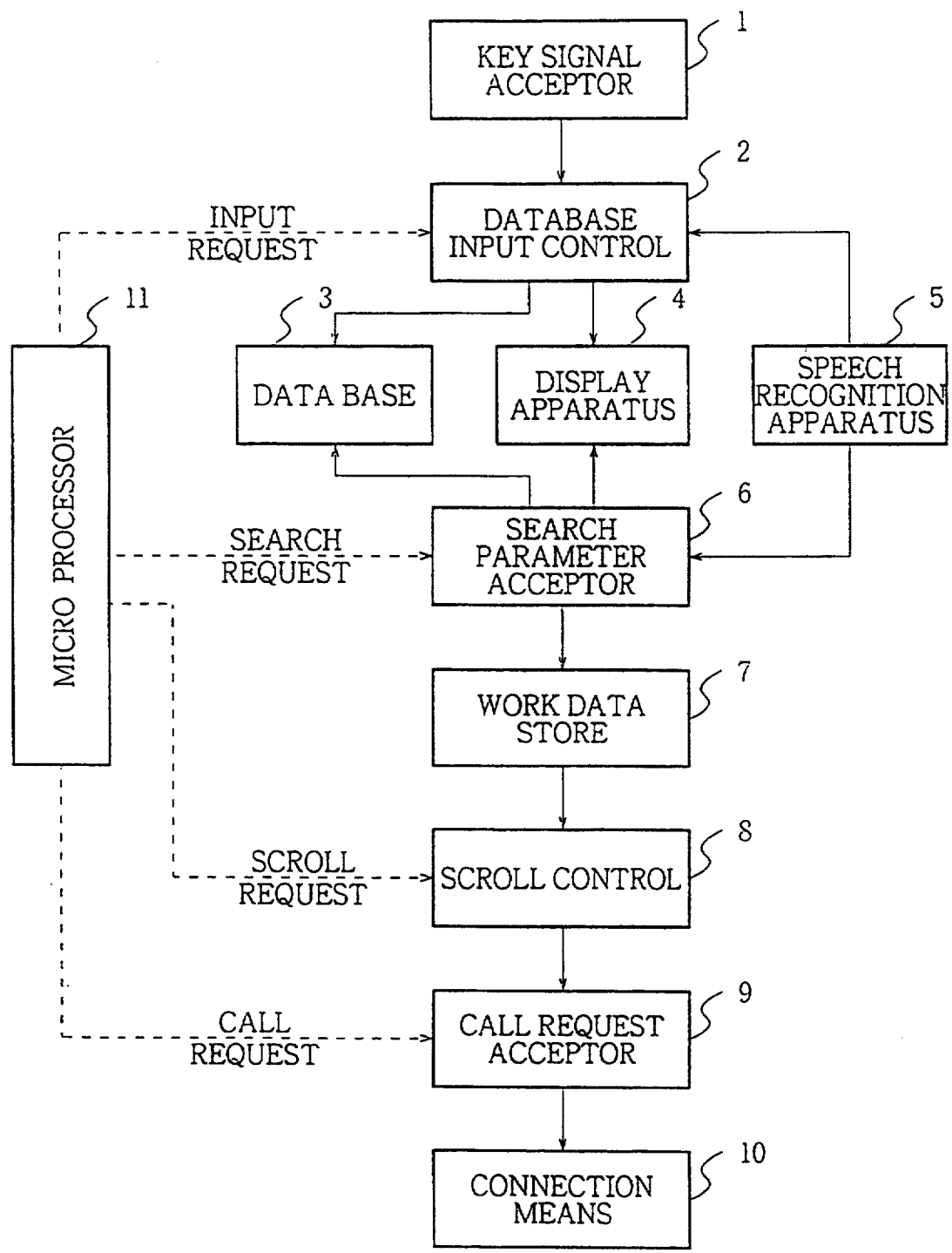
FIG. 1 is a block diagram of a mobile communication terminal, which is a preferred embodiment of the invention.

In the block diagram of the mobile communication terminal according to the present invention shown in FIG. 1, a key signal acceptor 1 has functions to detect the pressing-down of keys, each provided for a different function on the terminal, encode and notify the types of the pressed keys, and comprising LSI logic. A speech recognition apparatus 5 has a function to accept, identify and encode an input in a speech signal form. Various techniques for this speech recognition are being studied and developed with a view to expanding the recognizable vocabulary and improving the recognition rate. Typical such techniques include the HMM technique using the hidden Markov model, described in detail in the specifications of the U.S. Pat. No. 4,587,670, and the NPM technique using the multi-layered perception in the neural network as the standard pattern, described in detail in the U.S. patent application Ser. No. 07-873153, filed Apr. 24, 1992. These speech recognition techniques are already used for numeral inputting from telephone sets in the reference service of financial institutions. Further expansion of their use is likely in the future, and it is also expected to become possible to embody them in apparatuses of the wrist watch size along with the advancement of processor technology and LSI technology. A data base 3, which is an area in which subscriber number data matching the telephone directory are to be stored, is composed of a highly integrated memory. A data display apparatus 4, which is an area in which data to be registered in the data base 3 as well as the result of searching the data base 3 are displayed, consists of a liquid crystal display device. A data base input control apparatus 2, in response to a request for inputting to the data base from the key signal acceptor 1, causes data to be inputted in a prescribed sequence in cooperation with the data display apparatus 4, and stores into the data base 3 a record consisting of a first set of data (a telephone number) from the key signal acceptor 1 and a second set of data (a subscriber's name) from said speech recognition apparatus 5. A search parameter acceptor 6, in response to a request for searching the data base 3, causes data to be inputted in a prescribed sequence in cooperation with the data display apparatus 4, searches the data base 3 for the record according to a third set of data (the subscriber's name) from the speech recognition apparatus 5, and stores the retrieved record, which is the result of searching, into a work data store 7 consisting of a random access memory (RAM). A scroll control apparatus 8, in response to a request for scrolling, scrolls in predetermined units said retrieved record in the work data store 7, and displays them on the display apparatus 4. A call request acceptor 9, in response to a request for initiating a call, supplies a call initiating instruction according to the telephone number in said record which has been scrolled, and connection means 10 initiates a call by that telephone number in response to that call initiating instruction.

The recognition of the pressed key on the key signal acceptor 1 and the actuation control of the functional block (the data base input control apparatus 2, the search parameter acceptor 6, the scroll control apparatus 8 or the call request acceptor 9) corresponding to the type of the key are carried out by a microprocessor 11.

In FIG. 2 illustrating a typical configuration of records in the data base 3, the registered items include the subscriber's name, the name of the city and the telephone number.

Figure 3:
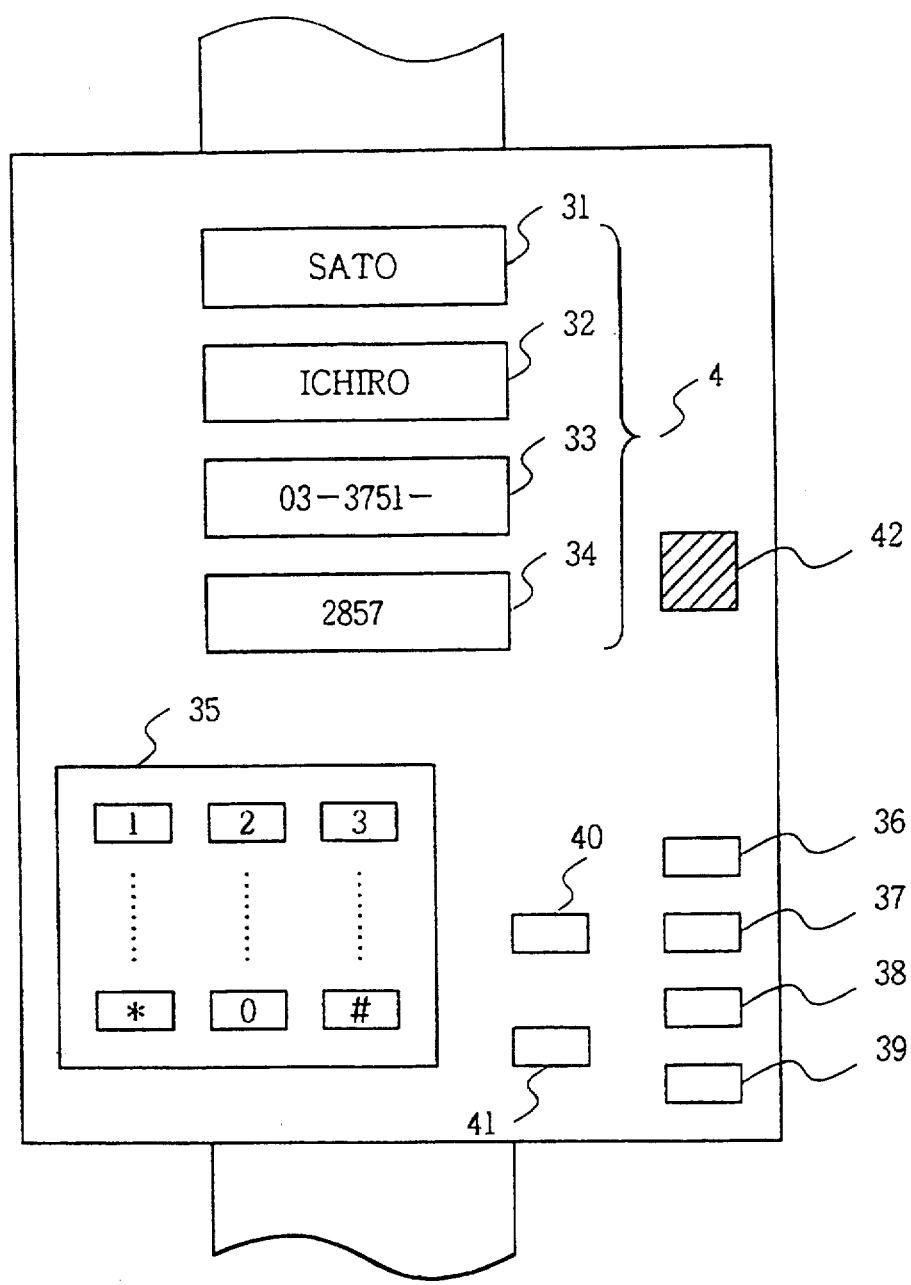
FIG. 3 illustrates a typical configuration of the man-machine interface in the mobile communication terminal according to the invention.

In FIG. 3 illustrating a typical configuration of the man-machine interface in a wrist watch-type mobile communication terminal, which is one of the conceivable applications of the present invention, the data display apparatus 4 has display parts 31 through 34 in which the time and other data pertinent to no particular call are shown when no call is being initiated, or the telephone number and name of the other party are shown when a call is being initiated; keys involved in telephone line connection including an on-hook key 41 for sending an on-hook signal, a call request key 39 for instructing call initiation, and an off-hook key 40 for sending an off-hook signal; and keys involved in the use of the data base including an input request key 36 for entering data into the data base; telephone keys 35 for entering a telephone number into the data base, a search request key 37 for use in searching the data base, and a scroll request key 38 for scrolling a record in the data base.

In this illustration, the display apparatus 4 is showing an example of input to the data base. Thus, in response to an instruction from the system, the display parts 31 and 32 show the name of a subscriber vocally entered through a microphohe 42, and the display parts 33 and 34, a telephone number entered with the keys 35. Other items shown in FIG. 2 than the name, i.e. the occupation of the subscriber and the name of the city in which he or she lives, can be entered into the display parts 31 and 32.

Figure 4:
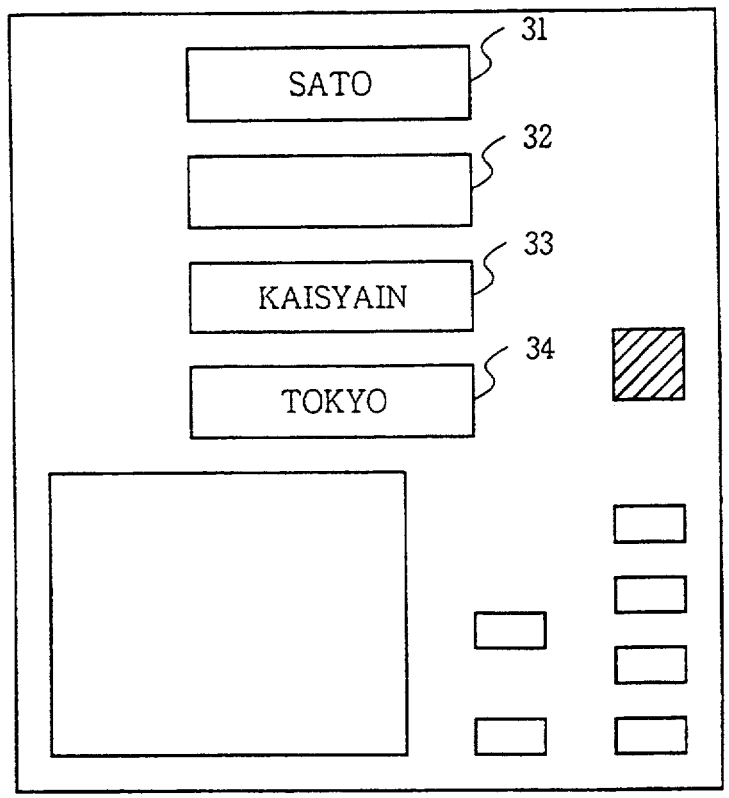
FIG. 4 illustrates a typical input of search parameters for the mobile communication terminal according to the invention.

In FIG. 4 illustrating an example of search parameter input, family name "SATO", occupation "KAISHAIN" (corporate employee) and city name "TOKYO" are shown in the display parts 31, 33 and 34, respectively.

Figure 5:
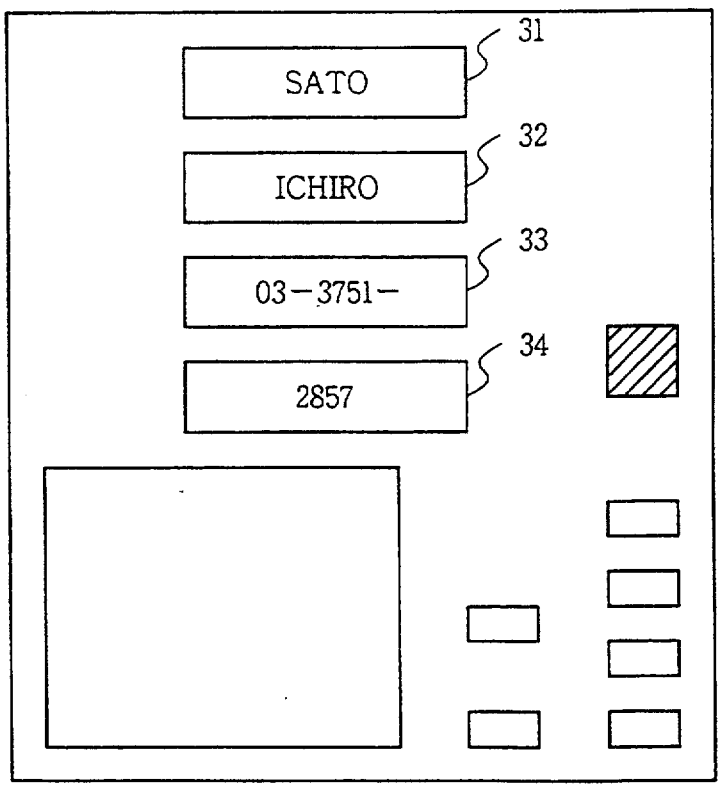
FIG. 5 illustrates a typical result of searching in the mobile communication terminal according to the invention.

In FIG. 5 illustrating an example of search result, retrieved family and given names "SATO" and "ICHIRO" are shown in the display parts 31 and 32, and the retrieved telephone number is shown in the display parts 33 and 34, all as a result of searching by the inputting of the subscriber data shown in FIG. 4.

Now will be described the operation of the present invention with reference to FIGS. 1 through 5.

When inputting to the data base is requested with the input request key 36, the data base input control apparatus 2 urges through the display parts 31 and 32 the calling party to enter the aforementioned personal name, occupation and city name.

The apparatus 2 transforms the speech signals in response to this urge entered through the microphone 42 into data with the speech recognition apparatus 5, and the data are shown in the display parts 31 and 32 of the display apparatus 4 as illustrated in FIG. 3. Since there are four items to be displayed, including the family and given names, occupation and city name, control is so carried out that, for instance, they are displayed on a time division basis, the family and given names in the first half of the time, and the occupation and city name, in the second half. Then the calling party is urged through the display parts 33 and 34 to enter the telephone number with the telephone keys 35. The telephone number entered in response to this urge is received by the key signal acceptor 1, and shown in the display parts 33 and 34 (FIG. 3). These received data are stored in the configuration illustrated in FIG. 2 into the data base 3.

Then, as searching of the data base is requested with the search request key 37, the search parameter acceptor 6 urges through the display parts 31 through 34 of the display apparatus 4 the calling party to enter the family and given names, occupation and city name in speech signals. The acceptor 6 transforms the speech signals in response to this urge entered through the microphone 42 into data with the speech recognition apparatus 5, and the data are shown in the display parts 31 through 34 (FIG. 4). At the same time, the data base 3 is searched according to the input data. In this example, the searching is accomplished using family name "SATO", occupation "KAISHAIN" and city name "TOKYO" as keys. The retrieved data are stored into the work data store 7, and the family and given names and the telephone number, first searched for in the searching procedure, are shown in the display parts 31 through 34 as illustrated in FIG. 5.

Next, when scrolling of a record in the data base is requested with the scroll request key 38, the scroll control apparatus 8 scrolls the data in the work data store 7 sequentially from the beginning, and the family and given names and the telephone number, which are the result of scrolling, are shown in the display parts 31 through 34 (FIG. 5).

Then, as call initiation according to this displayed telephone number is requested with the call request key 39, the call request acceptor 9 actuates the connection means 10 with the telephone number represented by the data just scrolled by the scroll control apparatus 8. The connection means 10, according to the telephone number given to it, initiates a call on the telephone network in the conventional protocol.

As hitherto described, the call initiation technique according to the present invention for mobile communication terminals is suitable for controlling telephone call initiation from mobile communication terminals drastically reduced in size because it has means for structuring a data base of subscriber numbers and entering data searching parameters both with speech signals, data scrolling means for scrolling retrieved data, and means for initiating a telephone call on the basis of scrolled data.

Although the invention has been described with reference to a specific embodiment, this description is not meant to be construed in a limiting sense. Various modifications of the disclosed embodiment, as well as other embodiments of the invention, will become apparent to persons skilled in the art upon reference to the description of the invention. It is therefore contemplated that the appended claim will cover any such modifications or embodiments as fall within the true scope of the invention.

What is claimed is:

1. A telephone call initiating system for use with mobile communication terminals, such as portable telephones, in call initiation by inputting the subscriber number of the party to be called, comprising: key input means for accepting inputs by key manipulation; speech recognition means for accepting inputs in speech signals; a data base and data display means; data base input control means responsive to a data base input request for causing data to be inputted in a prescribed sequence in cooperation with said data display means, and storing into said data base a record consisting of a first set of data indicating a telephone number, entered with said key input means, and a second set of data comprising family and given names and other prescribed items, entered with said speech recognition means; search parameter accepting means responsive to a data base searching request for causing data to be inputted in a prescribed sequence in cooperation with said data display means, searching said data base for said record according to a third set of data comprising said family and given names and said other prescribed items entered with said speech recognition means, and storing the retrieved record, which is the result of searching, into a prescribed work area; scroll control means responsive to a scroll request for scrolling in predetermined units said retrieved record in said work area, and displaying the data on said display means; call initiation accepting means responsive to a call initiation request for supplying a call initiating instruction according to said telephone number in said record which is the result of said scrolling; and call initiation processing means responsive to said call initiating instruction for initiating a call according to said telephone number.

* * * * *